Nov. 4, 1930.  P. L. TENNEY  1,780,727
RUBBER COUPLER
Filed Sept. 29, 1926   3 Sheets-Sheet 1

Inventor:
Perry L. Tenney
By Blackmore, Spencer & Hull
Attorneys.

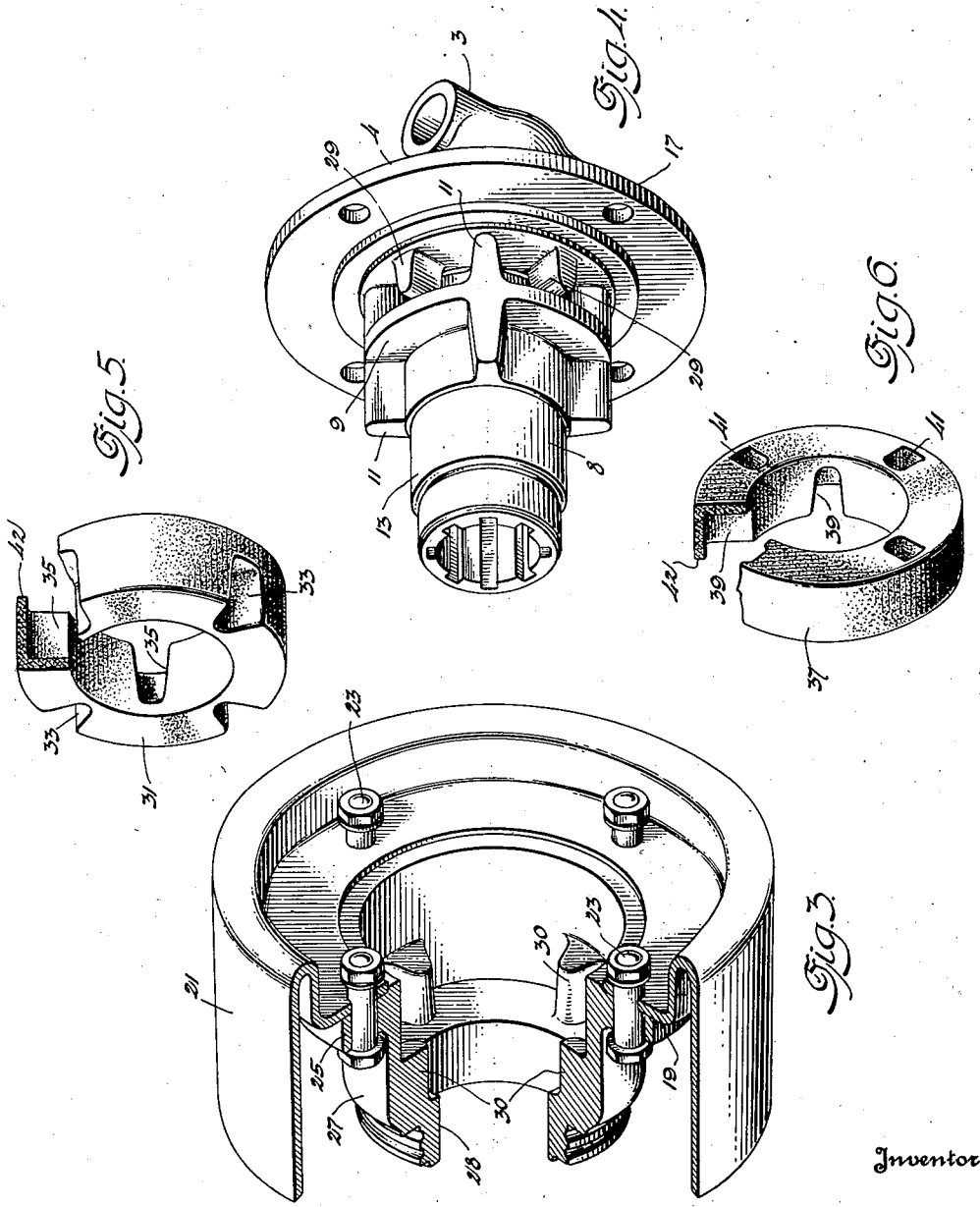

Nov. 4, 1930.  P. L. TENNEY  1,780,727
RUBBER COUPLER
Filed Sept. 29, 1926   3 Sheets-Sheet 3

Inventor:
Perry L. Tenney
By Blackmore, Spencer & Hulse
Attorneys.

Patented Nov. 4, 1930

1,780,727

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

RUBBER COUPLER

Application filed September 29, 1926. Serial No. 138,512.

This invention relates to a shaft coupling and is intended more particularly for use in coupling the transmission shaft of a motor vehicle with the propeller shaft.

The primary object is to drive one shaft from the other through the agency of a resilient member having sufficient rigidity to transmit the driving torque and it being sufficiently yieldable to absorb the high frequency vibrations which occur at certain speeds.

Among other objects the invention aims to provide a molded rubber element which is insertable in operative position between the adjacent ends of the shafts and which may be readily replaced; to provide parts which may be conveniently forged and which require a minimum amount of machining; to completely inclose the rubber element. Other objects and advantages will be apparent from a reading of the following specification.

The invention is herein fully described and is illustrated in the accompanying drawing in which:

Figure 3 is a perspective view of one part of the driven member associated with the brake drum.

Figure 4 is a perspective of another part of the driven member shown as associated with the driving sleeve.

Figure 5 is a perspective of one of the rubber blocks, and,

Figure 6 is a perspective of the second rubber block.

Figure 1:
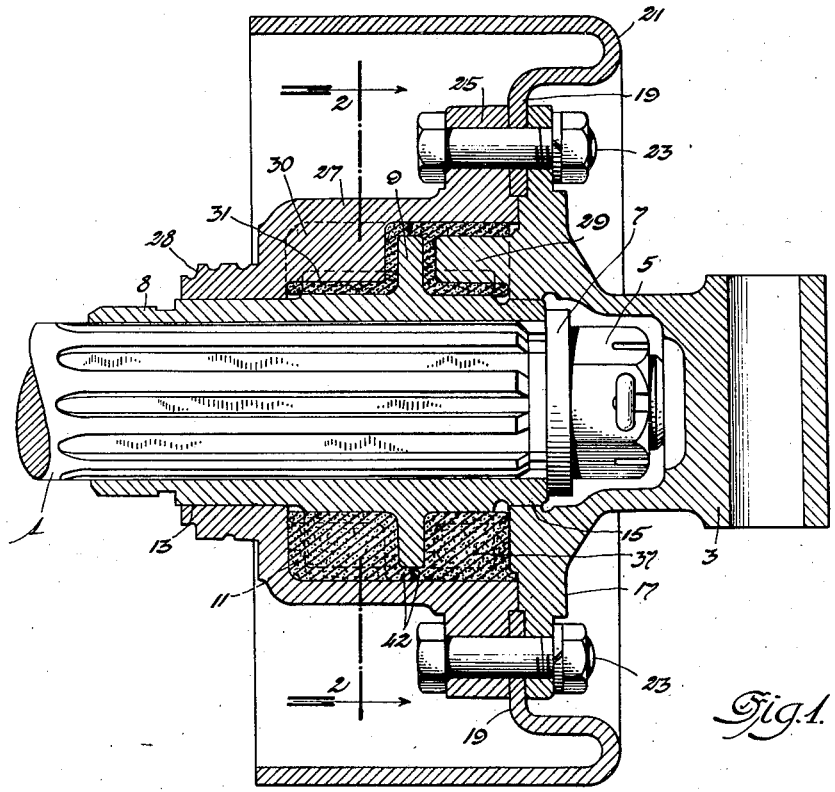
Figure 1 is a longitudinal sectional view of one form of the invention.
Figure 2:
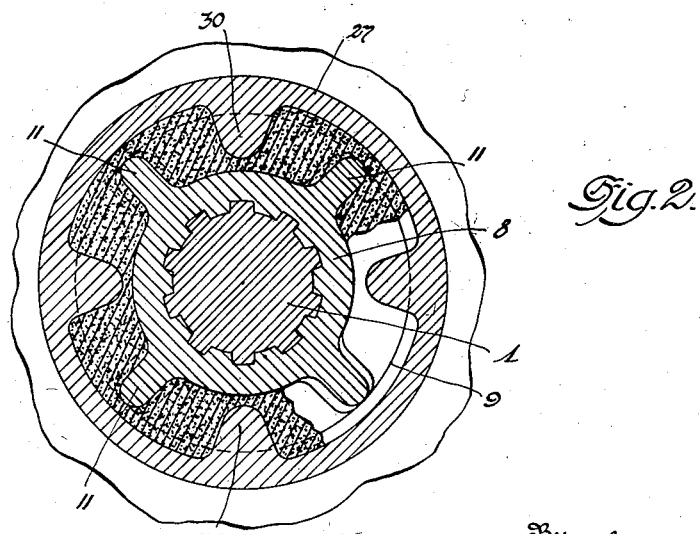
Figure 2 is a transverse section through the same on line 2—2 of Figure 1.

Referring by reference characters to the several figures of the drawing and first to Figures 1 to 6, inclusive, numeral 1 represents a vehicle transmission shaft. This shaft extends from the transmission casing (not shown) and is to drive the rear axle of the vehicle. The propeller shaft for driving the rear axle is usually coupled to the transmission shaft by a universal joint. In Figures 1 and 4 the front portion of such a joint is designated by numeral 3.

The coupling between the transmission shaft 1 and the universal joint member 3 constitutes the subject matter of this invention. Splined on the transmission shaft 1 and held by a nut 5 and washer 7 is a sleeve 8. The sleeve has an annular flange 9 at a point intermediate its length. Vanes 11 extend radially from the sleeve and axially from each side of the flange 9, the flange being, in effect, a web between the adjacent ends of the vanes. The vanes are of wedge shape, tapering both radially from the sleeve and axially from the flange. The sleeve is provided with a bearing surface 13 extending from the vanes part way toward one end of the sleeve. At the other end of the sleeve and beyond the vanes at the other side of the web is a second bearing surface 15.

The joint member 3, as shown in Figure 1, houses the nut 5 and is formed with a flange 17 which is positioned around and rotates on bearing surface 15, as shown in Figure 1. At its periphery the forward surface of flange 17 is recessed to receive the inner flange 19 of a transmission brake drum 21. The bolts 23 which secure the flanges 17 and 19 also secure rigidly to these flanges the annular flange 25 of an outer sleeve 27. This outer sleeve surrounds the inner sleeve and is spaced therefrom sufficiently to leave an annular space within the outer sleeve and around the web 9 (see Figure 1). The outer sleeve 27 also has a terminal surface 28 engaging the bearing surface 13. It will be observed that the bearing surfaces 13 and 15 are spaced at a considerable distance apart and are of the same relatively small diameter. This insures a correct alignment of the driving and driven members.

A series of generally wedge shaped vanes 30 are directed inwardly from the inner surface of the outer sleeve and so positioned that when the sleeves are assembled vanes 30 lie on one side of the web 9 and extend into the spaces between vanes 11 carried by the inner sleeve.

Another series of vanes 29 also of wedge shape extend axially from the face of flange 17 toward the web 9. These vanes are arranged alternately as before with vanes 11.

Two blocks of rubber are molded to have such shape and size to substantially fill the cavities within the housing 27 on each side of the web 9. Block 31 has recesses 33 to receive vanes 30 and recesses 35 to receive vanes 11. Block 37 has recesses 39 to receive vanes 11 and recesses 41 to receive vanes 29. Preferably, each block of rubber has an annular projection at 42, the two projections meeting and filling the space between the inner surface of the outer sleeve and the outer periphery of the web 9.

With the construction as above described it will be seen that the transmission shaft drives the propeller shaft through an incompressible but resilient instrumentality. The inner sleeve drives the universal joint member 3 together with the part 27 secured thereto through the agency of rubber blocks interposed between the vanes. The driven member constituted by parts 3 and 27 has a double bearing on the inner sleeve at 13 and 15. These two bearings are of sufficient length to give a good bearing surface. They are spaced well apart and their diameter is relatively small, thus ensuring the correct alignment of the driving and driven shafts. This arrangement also affords a very substantial support for a brake drum. The vanes are all tapered and of short length and the parts of the coupling are shaped to avoid undue difficulty in manufacture. The rubber blocks are molded before assembly and are readily removable and replaceable. Being molded before assembly they may be inspected and weighed to give assurance that the needed quantity of rubber is positioned in each cavity. The rubber is entirely closed, deformation occurring around the ends of the vanes. It is easily molded since the ridges of the rubber to receive the vanes must be of wedge form. It will be observed that the rubber filler blocks completely fill the housing and that no breather space is provided, the flow of rubber around the ends of the vanes doing away with the necessity of such breathing space. The wedge shape parts of the forgings and the rubber blocks provide also for a resilient resistance to axial thrusts.

Figure 7:
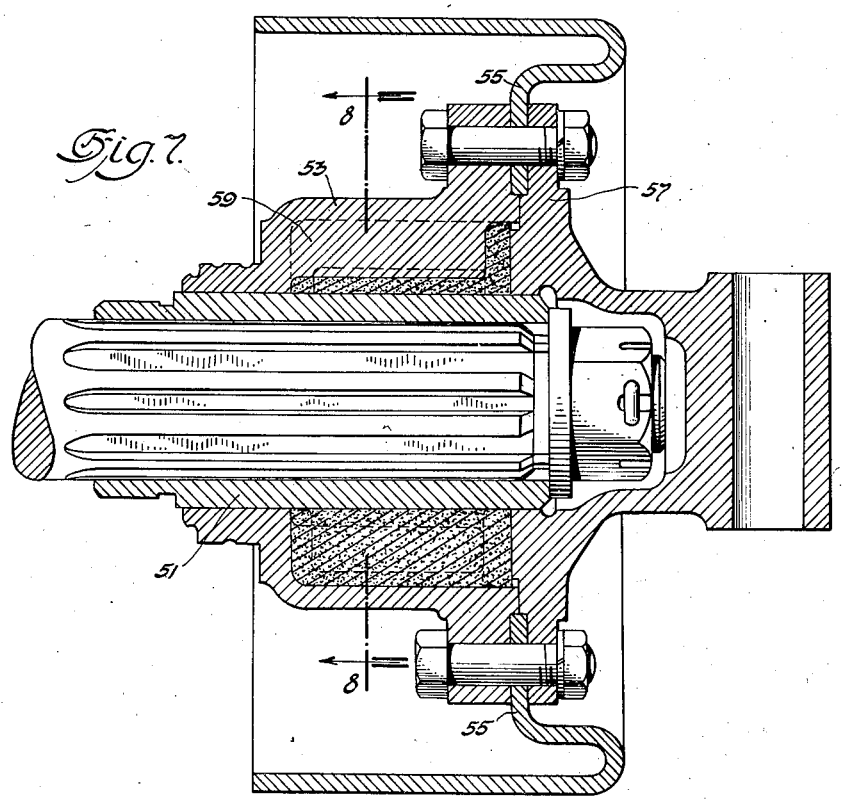
Figure 7 is a longitudinal section of a second embodiment of the invention.
Figure 8:
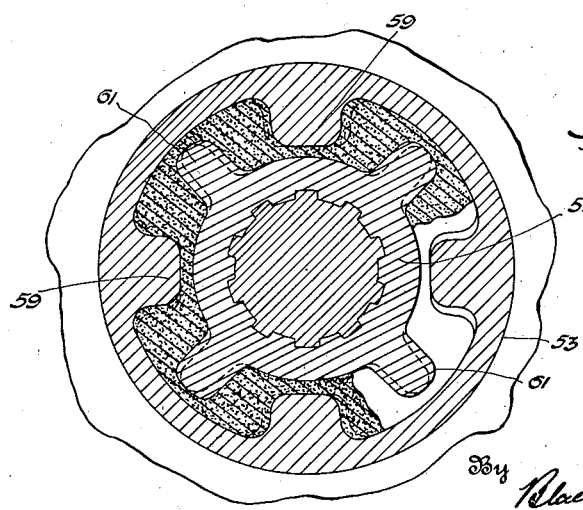
Figure 8 is a transverse section on line 8—8 of Figure 7.

A modified form to render more economical the making of the parts is shown in Figure 7 and Figure 8. In these figures the inner sleeve 51 is formed without the web used in the form previously described. The outer sleeve 53, the brake drum flange 55 and the universal joint flange 57 are bolted together as before. The axial vanes on the joint flange are omitted. The outer sleeve 53 and the joint flange 57 have bearing surfaces of equal diameter as before to secure alignment of the driving and driven members. Wedge shaped vanes 59 inwardly directed from the outer sleeve 53 alternate with similar vanes 61 outwardly extended from the inner sleeve 51. As illustrated, the vanes have both a radial and an axial taper. The rubber block, there being but a single block in this case, fills the cavity and as it deforms it flows in the spaces around the ends of the vanes. This form of invention possesses many of the advantages of the form first described and is much cheaper in manufacture. It, like the other, has the double bearing surface, the two surfaces being of equal radii, the radii being short as compared with the axial length of the bearing. The rubber completely fills the housing, the only deformation possible being around the ends of the vanes.

It may be explained that the purpose of the coupler herein described is two-fold. It must absorb the light high-speed vibrations at less than full load and also it must stand the full torque without undue yielding beyond the vibration point. It aims not only to provide a yielding coupling but to provide a coupling of peculiar design enabling it to absorb such light high-speed vibrations as occur at partial throttle due to torsional periods of motor transmission, drive shaft and axle and yet one which will stand the full torque.

I claim:

1. A coupling comprising driving members, one a sleeve, vanes radially directed from said sleeve, external bearing surfaces of equal diameter on said sleeve at each end of said vanes, the other member having internal surfaces engaging said bearing surfaces and inwardly directed vanes, and resilient torque resisting means filling the space between said sleeve and the other member.

2. A coupling comprising a driving sleeve having an intermediate radial web, vanes on each side of said web extending radially from the sleeve and axially from each side of said web, a driven member comprising an outer sleeve and a flange member secured thereto, vanes radially extended inwardly from the outer sleeve on one side of said web and vanes axially extended inwardly from said flanged member between the vanes on the other side of said web, resilient means between said vanes to resist relative movement thereof.

3. The combination of elements as set forth in claim 2, said vanes being tapered axially whereby the resilient means may resist thrust as well as torque.

4. The combination set forth in claim 2, said sleeve and flange forming a closed cavity, and said resilient means completely filling said cavity whereby deformation may occur only around the ends of said vanes.

In testimony whereof I affix my signature.

PERRY L. TENNEY.